Patented Aug. 5, 1941

2,251,743

UNITED STATES PATENT OFFICE 2,251,743

MANUFACTURE OF ORTHO-PHENOXY-BENZOIC ACID

William A. Knapp, New York, N. Y., assignor to General Chemical Company, New York, N. Y., a corporation of New York No Drawing. Application December 26, 1939, Serial No. 311,005

13 Claims. (Cl. 260—520)

The present invention relates to the manufacture of ortho-phenoxy-benzoic acid from ortho-phenoxy-phenyl-benzoate.

In the past it has been proposed to convert ortho-phenoxy-phenyl-benzoate to ortho-phenoxy-benzoic acid by heating the benzoate with aqueous caustic alkali solution to form the alkali-metal salt of ortho-phenoxy-benzoic acid, acidifying the aqueous solution to liberate the free acid, and mechanically separating the free acid from the aqueous solution. This process not only consumes a large amount of alkali in the first step and a correspondingly large amount of acid in the second but also involves the time and expense of a multi-step reaction, additional isolation, and if a pure product is desired, final purification.

In accordance with the present invention I have found that ortho-phenoxy-phenyl-benzoate may be readily converted to ortho-phenoxy-benzoic acid by heating the benzoate with water, preferably in the form of steam, in the presence of a small proportion of a hydrolytic agent. By this procedure the ortho-phenoxy-benzoic acid is formed in a single stage without the consumption of any substantial amount of reagent.

My preferred procedure involves bringing steam and molten ortho-phenoxy-phenyl-benzoate containing between ¼% and 10% of a highly ionized acid hydrolytic agent into contact at a temperature between 150° and 200° C. and about atmospheric pressure, separating liquid from vapor, and recovering the liquid as the ortho-phenoxy-benzoic acid product. By this procedure byproduct phenol separates as vapor from the reaction mixture substantially as rapidly as formed and may be recovered by simple condensation. If desired, the vapors may be rectified to separate any contained ortho-phenoxy-benzoic acid or ortho-phenoxy-phenyl-benzoate, which may be returned to the reaction zone. The liquid acid product may be purified in conventional manner or it may be used in its crude form, for example in production of dibenzopyrone.

Suitable hydrolytic agents for use in the process of my invention are the highly ionized acids in general and, in particular, sulfuric acid and sulfonic acids, for instance benzene-sulfonic-acid and chlorsulfonic-acid. An amount of the hydrolytic agent as low as 1% by weight of the benzoate to be reacted has been found to be highly satisfactory. I prefer to avoid a large proportion of the hydrolytic agent, say, amounting to more than 10% of the benzoate, because it not only accomplishes no useful purpose and contaminates the product but, in the case of sulfuric acid, it tends to sulfonate the phenol byproduct and reduce the yield of the ortho-phenoxy-benzoic acid by converting a part of the acid to dibenzopyrone. Although this latter conversion is not objectionable where the acid product is being prepared as an intermediate for manufacture of dibenzopyrone, the sulfonation of the phenol is even in this case decidedly objectionable since the phenol sulfonate produced has relatively little market value compared with the phenol and furthermore is not separated from the product in as expedient a fashion as the phenol.

The following examples illustrate the procedure of my invention.

*Example 1.*—150 parts by weight of ortho-phenoxy-phenyl-benzoate are introduced into a vessel (which may be constructed of glass, lead, etc. and is provided with a heating jacket and a vapor outlet and having means for introducing steam beneath the surface of the liquid therein) and heated to a temperature in the neighborhood of 120° C. 3 parts by weight of aqueous 50% sulfuric acid (equal to 1% of $H_2SO_4$) are then added and the temperature is raised to 145° to 150° C. whereupon steam is introduced slowly into the molten mass and the temperature further raised to about 170° C. After reaction has proceeded to some extent, the introduction of steam may be accelerated if desired. The vapors at a temperature between 120° and 140° C. are continuously withdrawn and cooled to condense water and phenol. During the early part of the reaction the phenol amounts to about 90% of the condensate, but the amount coming over gradually decreases as the reaction proceeds until at substantial completion of the reaction it is less than 5% of the condensate.

In one test by this procedure there was obtained in the reaction vessel a yield of ortho-phenoxy-benzoic acid equivalent to 93.9% of the theoretical yield. In addition to the acid the reaction mass also contained phenol and dibenzopyrone, the latter in amount equivalent to about 4% of the theoretical yield. In the condensate there were obtained an amount of ortho-phenoxy-benzoic acid corresponding to 1.4% of the theoretical yield and 0.45 parts by weight of unreacted ester. Thus, in the reaction vessel and condensate about 99.6% of the ortho-phenoxy-phenyl-benzoate was found accounted for as follows: 95.3% as ortho-phenoxy-benzoic acid, 4% as dibenzopyrone, and 0.3% as unreacted ortho-phenoxy-phenyl-benzoate. The phenol recovery in the condensate amounted to 91.6% of the theoretically obtainable amount and that in the liquid reaction product amounted to 5.1% or a total of 96.7% of the theoretically recoverable phenol.

It will be apparent that with sharp fractionation practically all of the phenol may be collected as condensate and practically all of the ortho-phenoxy-benzoic acid as liquid residue. The ortho-phenoxy-benzoic acid may be separated from $H_2SO_4$ by water washing or by neutralizing a hydrogen of the $H_2SO_4$ with alkali and filtering the hot mixture or distilling off the phenoxy-benzoic acid.

Benzene sulfonic acid used in the same proportions and under otherwise similar reaction conditions also gives good yields of ortho-phenoxy-benzoic acid and phenol.

*Example 2.*—The process conducted as in the preceding example employing 150 parts by weight of ortho-phenoxy-phenyl-benzoate and 4.5 parts by weight of aqueous 50% sulfuric acid (i. e. 1½% of hydrolytic agent), gave a total yield of ortho-phenoxy-benzoic acid equivalent to 94.4% of the theoretical, plus an additional 5.3% in the form of dibenzopyrone and a recovery of 0.3% of the ortho-phenoxy-phenyl-benzoate in unreacted form. The phenol recovery amounted to 92% of theoretical.

*Example 3.*—In a process conducted as in the preceding example, employing 100 parts by weight ortho-phenoxy-phenyl-benzoate and 7 parts by weight of aqueous 50% sulfuric acid (i. e. 3½% of hydrolytic agent), the total yields expressed as percentages of theoretical were as follows: ortho-phenoxy-benzoic acid 82.4%, dibenzopyrone 13.5%, phenol 95.6%, unreacted ortho-phenoxy-phenyl-benzoate 0.5%.

*Example 4.*—In a process conducted as in the preceding example, employing 150 parts by weight ortho-phenoxy-phenyl-benzoate and 28 parts by weight of aqueous 50% sulfuric acid (i. e. 9⅓% of hydrolytic agent), the total yields expressed as percentages of theoretical were as follows: ortho-phenoxy-benzoic acid 67.0%, dibenzopyrone 27.0%, phenol 90.5%, unreacted ortho-phenoxy-phenyl-benzoate 1.3%.

It will be noticed that in the above examples an increase in the proportion of sulfuric acid employed as hydrolytic agent caused a lower yield of ortho-phenoxy-benzoic acid and a higher yield of dibenzopyrone. The examples also suggest that higher proportions of sulfuric acid may cause a reduction in the proportion of phenol recovered as such. The following example using a larger proportion of hydrolytic agent further illustrates these effects.

*Example 5.*—150 parts by weight ortho-phenoxy-phenyl-benzoate were mixed with 72 parts of aqueous 52% sulfuric acid and reacted as in the preceding examples. The percentages of theoretical yield were as follows: ortho-phenoxy-benzoic acid 18.5%, dibenzopyrone 66.7%, phenol 74.9%, unreacted ester 1%. It will be noted that the recovery of phenol decreased from 96.7% in Example 1 to less than 75% in this example, and the yield of ortho-phenoxy-benzoic acid decreased from over 95% to less than 19%.

I claim:

1. The method of converting ortho-phenoxy-phenyl-benzoate to ortho-phenoxy-benzoic acid, which comprises heating the ortho-phenoxy-benzoate with water in the presence of a small amount of a hydrolytic agent compared with the amount of ortho-phenoxy-phenyl-benzoate present in the conversion zone.

2. The method of converting ortho-phenoxy-phenyl-benzoate to ortho-phenoxy-benzoic acid, which comprises bringing steam and the ortho-phenoxy-phenyl-benzoate containing a minor proportion of a hydrolytic agent into contact at a temperature between 150° C. and 200° C.

3. The method of converting ortho-phenoxy-phenyl-benzoate to ortho-phenoxy-benzoic acid, which comprises bringing steam and the ortho-phenoxy-phenyl-benzoate containing a minor proportion of a hydrolytic agent into contact at a temperature between 150° C. and 200° C. and withdrawing phenolic vapors from the reaction zone.

4. The method of converting ortho-phenoxy-phenyl-benzoate to ortho-phenoxy-benzoic acid, which comprises heating the ortho-phenoxy-phenyl-benzoate with water in the presence of a small amount of sulfuric acid, not more than 10% of the ortho-phenoxy-phenyl-benzoate present in the conversion zone.

5. The method of converting ortho-phenoxy-phenyl-benzoate to ortho-phenoxy-benzoic acid, which comprises heating the ortho-phenoxy-phenyl-benzoate with water in the presence of a small amount of sulfonic acid, not more than 10% of the ortho-phenoxy-phenyl-benzoate present in the conversion zone.

6. The method of converting ortho-phenoxy-phenyl-benzoate to ortho-phenoxy-benzoic acid and phenol, which comprises heating the ortho-phenoxy-phenyl-benzoate with water and a small proportion, not more than 10% of the ortho-phenoxy-phenyl-benzoate, of a highly ionized acid hydrolytic agent at a temperature above 150° C. and below that at which substantial thermal decomposition of the reaction components occurs.

7. The method of converting ortho-phenoxy-phenyl-benzoate to ortho-phenoxy-benzoic acid, which comprises passing steam through a molten mass of ortho-phenoxy-phenyl-benzoate containing as a hydrolytic agent sulfuric acid in a proportion corresponding to an $H_2SO_4$:ortho-phenoxy-phenyl-benzoate ratio of not more than 10%, at a temperature between 150° C. and 200° C. and withdrawing aqueous phenolic vapors from the reaction zone.

8. The method of converting ortho-phenoxy-phenyl-benzoate to ortho-phenoxy-benzoic acid and phenol, which comprises passing steam into intimate contact with a molten mass of ortho-phenoxy-phenyl-benzoate, containing between ¼% and 10% of an acid hydrolytic agent, at a temperature between 150° C. and 200° C. and at substantially atmospheric pressure, whereby a liquid phase comprising ortho-phenoxy-benzoic acid and an aqueous phenol vapor phase are produced, continuously withdrawing aqueous phenol vapors from the reaction zone, cooling the vapors to condense phenol, and collecting condensed phenol apart from the liquid phase comprising ortho-phenoxy-benzoic acid.

9. The method of converting ortho-phenoxy-phenyl-benzoate to ortho-phenoxy-benzoic acid and phenol, which comprises heating with water a liquid phase reaction mass comprising ortho-phenoxy-phenyl-benzoate and containing as a hydrolytic agent between ¼% and 10% of $H_2SO_4$ at a temperature above 150° C. and below that at which substantial thermal decomposition of the reaction components occurs.

10. The method of converting ortho-phenoxy-phenyl-benzoate to ortho-phenoxy-benzoic acid and phenol, which comprises heating with water a molten reaction mass comprising ortho-phenoxy-phenyl-benzoate and ortho-phenoxy-benzoic acid, and containing as a hydrolytic agent between ¼% and 10% of $H_2SO_4$ at a temperature between 150° C. and 200° C. and withdrawing aqueous phenolic vapors from the reaction zone.

11. The method of converting ortho-phenoxy-phenyl-benzoate to ortho-phenoxy-benzoic acid and phenol, which comprises passing steam into intimate contact with a molten mass of ortho-phenoxy-phenyl-benzoate, containing between ¼% and 10% of sulfuric acid, at a temperature between 160° C. and 175° C. and at substantially atmospheric pressure, whereby a liquid phase comprising ortho-phenoxy-benzoic acid and an aqueous phenol vapor phase are produced, continuously withdrawing aqueous phenol vapors from the reaction zone, cooling the vapors to condense phenol, and collecting condensed phenol apart from the liquid phase comprising ortho-phenoxy-benzoic acid.

12. The method of converting ortho-phenoxy-phenyl-benzoate to ortho-phenoxy-benzoic acid, which comprises heating the ortho-phenoxy-phenyl-benzoate with water at a temperature above 150° C. and below that at which substantial thermal decomposition of the reaction components occurs, in the presence of an amount of hydrolytic agent not more than a small proportion of the reaction mass present.

13. The method of converting ortho-phenoxy-phenyl-benzoate to ortho-phenoxy-benzoic acid, which comprises heating the ortho-phenoxy-phenyl-benzoate with water at a temperature above 150° C. and below that at which substantial thermal decomposition of the reaction components occurs, in the presence of an amount of highly ionized acid hydrolytic agent not more than 10% of the reaction mass.

WILLIAM A. KNAPP.